Figure 1:
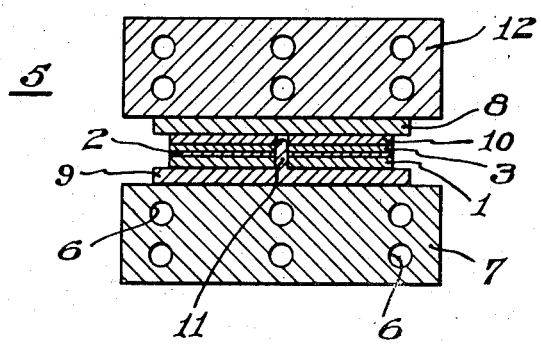

June 29, 1948. E. P. RUGGIERI 2,444,314
METHOD OF MAKING PHONOGRAPH PRESSING MATRICES
Filed May 27, 1944

Inventor
Ernest P. Ruggieri
By
Attorney

Patented June 29, 1948

2,444,314

UNITED STATES PATENT OFFICE 2,444,314

METHOD OF MAKING PHONOGRAPH PRESSING MATRICES

Ernest P. Ruggieri, Philadelphia, Pa., assignor to Radio Corporation of America, a corporation of Delaware Application May 27, 1944, Serial No. 537,546

1 Claim. (Cl. 154—139)

This application is a continuation-in-part of abandoned application Serial No. 359,175, filed September 30, 1940.

This invention relates to improvements in the art of making phonograph record pressing matrices.

According to conventional practice in forming record pressing matrices, the original wax recording is first covered with a fine powder layer of conductive material and a suitable metallic deposit is electroplated thereon. This deposit is removed from the wax, and, after being backed up by a copper or other metal backing, serves as the master matrix. To the face of the master is then applied a suitable separating medium over which another metallic layer is electro-deposited. The latter, being an exact copy of the original wax record but in more durable form, serves as a mold after it, too, has been reinforced by a suitable backing. A matrix is then made from the mold, also by electro-deposition of the metal layer thereon, and this matrix, after also being reinforced by a suitable backing plate, is employed in pressing the phonograph records of commerce.

A soldering operation which requires the application of a substantial pressure force to the parts has heretofore been required in affixing the backing plates to phonograph record pressing matrices. The principal objection to this standard method of backing a matrix is that the plated metal, of which the matrix is formed, is frequently pervious to solder; that is to say, the solder under pressure may penetrate to and spread over the face of the matrix where it hardens and ruins the sound track. The seriousness of this problem is indicated by the fact that, while only the most skilled technicians are employed in the making and backing of such matrices, the average of rejects in commercial production is more than 20 percent.

It has previously been proposed (see Edison 1,118,114) to dispense entirely with solder by so finishing the surface of the backing plate and the adjacent face of the electroform or matrix that the said parts may be caused to lie closely in engagement with each other and then securing the same at their edges, as with screws or other mechanical clamping elements. One very real objection to matrices made in accordance with this prior art method is the tendency of the matrix to creep on and with respect to its backing plate, thus ruining the sound track on the records which are pressed therefrom.

Another proposed solution of the problem of backing record pressing matrces involves the use of press pads constituted of materials which work their way into the minute openings in the electroform. This method has not achieved a great degree of success, principally because the said materials, though effective in preventing the exuded solder from spreading over the face of the matrix, cannot entirely prevent localized exudation. Further, the problem of "blisters," due to practical difficulties in the fluxing of the solder, and which result in shattered matrices, are in no wise solved by the use of such special pads.

Accordingly, the principal object of the present invention is to obviate the foregoing and other disadvantages of the phonograph record pressing matrices and other electroforms of the prior art.

Another object of the invention is to provide a substantially shatter-proof record pressing matrix having a long life and one which, in its use, produces the minimum number of nonusable records.

Stated briefly: the foregoing and other objects are achieved in accordance with the present invention by making the bond between the electroform or record pressing matrix, and its backing plate of a soluble adhesive of a type which can be dissolved by a solvent which does not attack the metal of which the matrix is formed. Thus, should the bonding material penetrate the matrix, by applying the solvent the exudate may easily be removed without injury to the metal face of the matrix or to the sound track thereon.

Figure 2:
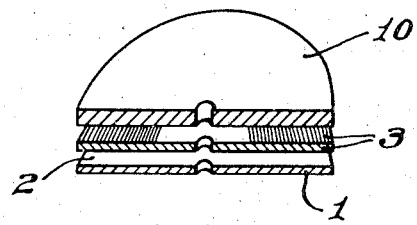
Figure 3:
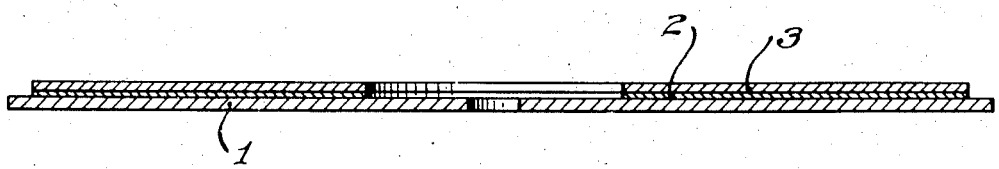

Certain preferred details of procedure and construction will be apparent and the invention itself will be best understood by reference to the following specification and to the accompanying drawing, wherein:

Figure 1 is a sectional view of a press adapted for uniting electroform or matrix shell to a backing plate, and shows the manner in which the shell and backing are united, Figure 2 is an exploded view partly in perspective and partly in section of the pressing assembly or "stack" shown in Fig. 1, and Figure 3 is a cross sectional view of a phonograph record pressing matrix constructed in accordance with the principle of the invention.

Any natural or synthetic adhesive or mixture of adhesives having the characteristic above described and capable of forming a metal-to-metal bond which will stand up under normal use may be employed in carrying the invention into effect. One satisfactory method of forming such a bond is disclosed in copending application Serial No. 359,129 filed September 30, 1940 by Gregory W. Blessing, now U. S. Patent 2,423,869 issued July 15, 1947. The said copending application discloses the bonding of metal parts into a composite structure with the use of synthetic resins by a method or process which involves the use of bonding materials which have been freed or substantially freed of bubble forming solvents prior to the bonding operation and the use of temperatures and/or pressures in the bonding operation greatly in excess of that required to render such materials fluid, yet not so great as to cause complete pyrolysis of said material.

Referring now to the drawing: In applying the Blessing "thermoplastic fusion method" to the practice of the present invention the backing plate 1 and the electrotype or matrix shell 3 are first thoroughly cleansed as with trichlorethylene or similar solvent and then preferably coated on one side only with a coat 2 of a synthetic resinous bonding material such, for instance, as: (a) polyvinyl acetate, (b) hydrolyzed polyvinyl acetate, (c) polyvinyl acetate and pyroxylin or (d) "Glyptal." Hydrolyzed polyvinyl acetate is sold by the Union Carbide and Carbon Chemical Corporation under the grade mark XL5057 and is understood to comprise a 28 percent by weight solution of polyvinyl acetate in methyl acetate. "Glyptal" is the trade name used by the General Electric Company to designate a patented class of synthetic resins which it manufactures and sells Reference is made to Hovey Patent 1,925,903, dated September 5, 1933 and relating to a cement composition consisting of nitrocellulose and a modified alkyd resin for a complete definition of this type of resin. The General Electric Company's grade mark for their thermoplastic cement ("c" above) containing polyvinyl acetate and pyroxylin is "No. 2142," (formerly designated "ZV5957").

The coating 2 which is applied to the backing plate 1 and/or to the base of the matrix shell 3 should be thick enough to prevent local breaks in the coat when it is subjected to the drying operations and yet thin enough to ensure rapid and uniform transfer of heat between the parts to be bonded. These requirements are usually satisfied when the coatings are of a thickness of the order of from, say, .005" to .001".

A conventional press 5 having coils 6 in its base 7, through which steam is circulated, may be employed in the production of the improved record pressing matrices of the present invention. In this case, the press is preferably provided with a pair of removable top and bottom plates 8, 9, respectively, between which the matrix backing plate 1, the matrix shell 3 and a cardboard or other relatively soft pressing pad 10 are assembled upon an upstanding pin 11. The adjacent surfaces to be united and the thoroughly dry coatings or sheets of film of the bonding material are now subjected to the heat aand pressure of the press. The pressure is applied by bringing down the head of the press on the assembled stack. The mechanical force employed in the bonding operation should preferably, but not necessarily, be of the same general order of intensity, (in this case, say, 1800 lbs. per square inch) as that to which the completed matrix will be subjected during normal operation (that is, in the molding of records).

As taught by Blessing, the temperatures employed in his bonding method should preferably be high enough to scorch the bonding material, yet not so high as to result in its complete pyrolysis. The thermoplastic bonding materials mentioned above change color just below their decomposition point and this affords a satisfactory indication of the proper time to remove the structure away from the source of heat. This point is reached in the usual colorless thermoplastic materials and also in those to which an aniline dye has been added (to enable the operator to distinguish between coated and uncoated parts or to give an indication of the relative thickness of the applied coating) when the material presents a "scorched appearance" or assumes a brownish or straw colored hue.

Other bonding materials and procedures may be employed in carrying the present invention into effect since, as previously indicated, the only limitations in this respect are: (a) that the bonding material be of a type capable of being removed from the surface of the matrix or other electroform without affecting, adversely, the metal of which the electroform is constituted and (b) that the bonding material and technique employed in its use be such as to ensure a bond which will stand up under normal stresses and strains. As indicated in U. S. Patent 2,280,981 to Arthur E. Schuh, acrylate and methacrylate ester resins provide a strong metal-to-metal bond and, since such resins are soluble in acetone, benzine, butyl alcohol and other solvents to which metals are immune, may be used in carrying the present invention into effect.

When applying the solvent to the face of a porous matrix shell for the purpose of removing the exudate, the solvent should be applied locally as with an orangewood stick or a clean cloth and wiped off with care to avoid scratching or otherwise marring the sound track.

What is claimed is:

The method of making a phonograph pressing matrix of the type comprising a metal backing plate and a thin metal disc which has a sound track on its front surface and which is slightly porous to a resinous bonding material capable of being dissolved by a solvent which does not attack said metal disc, said method comprising covering the rear surface of said metal disc and the facing surface of said metal backing plate with said bonding material drying said bonding material, assembling said dry surfaces, subjecting said assembly to heat sufficient to render said bonding material tacky and to pressure sufficient to cause a portion of said bonding material to exude through said metal disc and to the front surface thereof, and thereafter dissolving from said front surface the exuded bonding material with the aid of said solvent whereby to free said sound track from said bonding material.

ERNEST P. RUGGIERI.

REFERENCES CITED

The following references are of record in the file of this patent:

UNITED STATES PATENTS

| Number | Name | Date |
| --- | --- | --- |
| 843,483 | McGovern | Feb. 5, 1907 |
| 1,378,573 | Taylor | May 17, 1921 |
| 2,092,880 | Hunter et al. | Sept. 14, 1937 |
| 2,280,981 | Schuh | Apr. 28, 1942 |
| 2,341,398 | Strother | Feb. 8, 1944 |

FOREIGN PATENTS

| Number | Country | Date |
| --- | --- | --- |
| 17,809 | Australia | Jan. 12, 1929 |